E. T. KIRKPATRICK.
SAW HANDLE.
APPLICATION FILED JULY 9, 1907.

921,121.

Patented May 11, 1909.

Ernest T. Kirkpatrick Inventor

UNITED STATES PATENT OFFICE.

ERNEST THOS. KIRKPATRICK, OF CORA, IDAHO.

SAW-HANDLE.

No. 921,121.     Specification of Letters Patent.     Patented May 11, 1909.

Application filed July 9, 1907. Serial No. 382,881.

*To all whom it may concern:*

Be it known that I, ERNEST THOMAS KIRKPATRICK, a citizen of the United States, residing at Cora, in the county of Latah and State of Idaho, have invented a new and useful Saw-Handle, of which the following is a specification.

The invention relates to improvements in saw handles.

The object of the present invention is to improve the construction of saw handles, and to provide a simple, inexpensive and efficient device of great strength and durability, adapted to space a handle from the end of the blade of a crosscut saw, and adapted to connect the handle at an intermediate point with the saw blade to provide upper and lower grip portions to enable the saw to be advantageously employed for cutting either up or down.

A further object of the invention is to provide a device of this character, consisting of few parts, and adapted to enable a saw handle to be quickly applied to and removed from a saw blade.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

Figure 1:
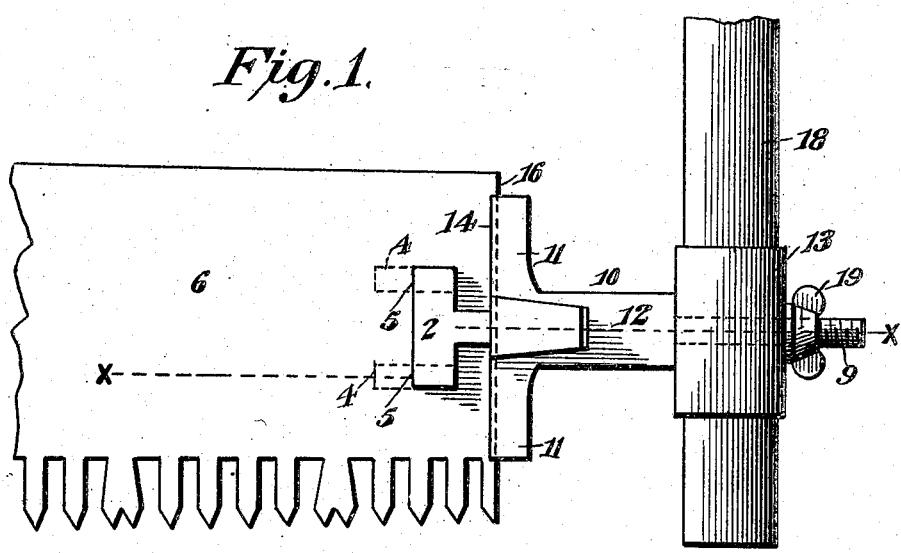
Figure 2:
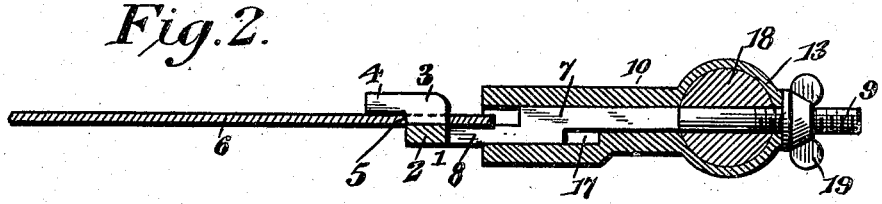
Figure 3:
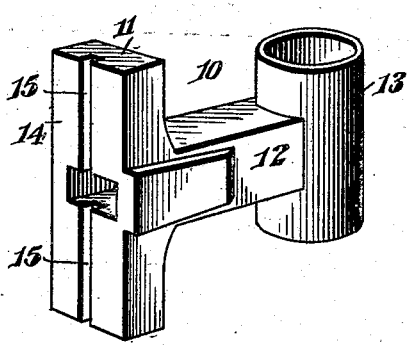
Figure 4:
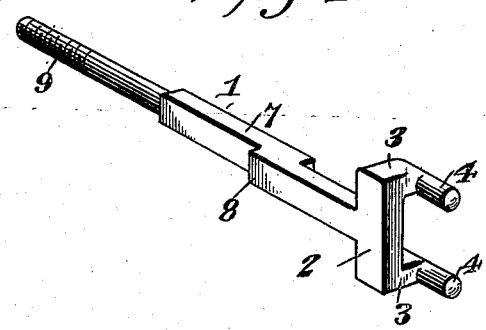

In the drawing:—Figure 1 is a side elevation of a saw handle attaching device, constructed in accordance with this invention and shown applied to a saw blade and handle. Fig. 2 is a horizontal sectional view on the line *x—x* of Fig. 1. Fig. 3 is a detail perspective view of the saw-engaging member, which coöperates with the bolt. Fig. 4 is a detail perspective view of the bolt.

Like numerals of reference designate corresponding parts in all the figures of the drawing.

1 designates a bolt, provided with a hook-shaped head, having upper and lower hooks and consisting of a vertical connecting portion 2, upper and lower laterally extending arms 3, and upper and lower longitudinally disposed extensions 4, which extend from the outer ends of the transversely disposed arms. The upper and lower hooks are adapted to be passed through upper and lower openings 5 of a saw blade 6, and they are introduced into the openings from one side of the blade, and the extensions extend along the opposite side or face of the blade, whereby both of the side faces of the saw blade 6 are engaged by the hook-shaped head. The vertical portion 2 extends above and below the bolt and fits against one of the side faces of a saw blade. The shank of the bolt is provided with an inner polygonal portion 7, having an off-set 8, which arranges the connecting portion 2 of the head of the bolt to one side of the median line of the shank of the bolt to permit the saw blade to be arranged in the same longitudinal plane as the threaded portion 9 of the shank and the contiguous polygonal portion of the same. This construction enables the bolt to exert a direct tensile strain on the saw blade without liability of twisting or bending the same.

The bolt coöperates with a saw blade-engaging member 10, consisting of a vertical jaw 11, a horizontal sleeve 12 and a vertical sleeve 13. The saw-receiving member spaces the handle from the end of the saw blade, and the vertical jaw, which is substantially rectangular in horizontal section, has an inner flat transverse face 14, which is provided with a vertical groove 15 to receive the end edge 16 of the saw blade. The horizontal sleeve 12, which extends outwardly from the center of the vertical jaw, is provided with a polygonal opening 17, which also extends through the jaw and which receives the polygonal portion of the shank of the bolt. The vertical sleeve 13, which is connected at the center of one side to the outer end of the horizontal sleeve 12, extends above and below the latter and receives an intermediate portion of the handle 18, which extends above and below the vertical sleeve 13 to provide upper and lower grip portions, so that the saw may be advantageously employed in cutting either up or down. The threaded portion of the bolt pierces the handle and is engaged by thumb nut 19, which bears against the outer side of the sleeve 13. The nut is adapted to draw the edge of the blade in the groove of the jaw 11, and the saw blade is tightly gripped and securely held by the handle attaching device. Also the nut is adapted to be readily loosened to enable a handle to be quickly removed, when desired.

Having thus fully described my invention, what I claim as new and desire to secure by Letters Patent, is—

An attachment in the nature of a connection between the saw blade and the handle of a cross cut saw, said attachment comprising a member made in a single piece and consisting of a horizontal sleeve provided with a polygonal longitudinal opening, a vertical jaw arranged at the inner end of the horizontal sleeve and grooved to receive one end of the saw blade, and a vertical sleeve connected at an intermediate point with the outer end of the horizontal sleeve and receiving the handle of the saw, a bolt also made in a single piece and composed of a horizontal shank extending through the said member and having a polygonal portion to fit the polygonal portion of the horizontal sleeve and provided with a threaded outer portion piercing the handle, a vertical bar connected at an intermediate point with the inner end of the shank and extending upwardly and downwardly from the same and fitted against one face of the saw blade, and spaced upper and lower hooks connected with the upper and lower ends of the vertical bar and extending through the saw blade and engaging the opposite face thereof, and a nut arranged on the threaded portion of the shank of the bolt and engaging the vertical sleeve.

In testimony, that I claim the foregoing as my own, I have hereto affixed my signature in the presence of two witnesses.

ERNEST THOS. KIRKPATRICK.

Witnesses:
   O. P. CALEF,
   C. E. HAYFIELD.